(12) United States Patent
Donabedian et al.

(10) Patent No.: US 12,083,838 B2
(45) Date of Patent: Sep. 10, 2024

(54) ADDITIVELY MANUFACTURED TOW HOOK

(71) Applicant: Ford Global Technologies, LLC, Dearborn, MI (US)

(72) Inventors: Edgar Edward Donabedian, Livonia, MI (US); David D. Friske, Wolverine Lake, MI (US); Mikhail Minevich, Livonia, MI (US); Michael Joseph Niksa, Royal Oak, MI (US); Nicholas Dornik, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 398 days.

(21) Appl. No.: 17/350,323

(22) Filed: Jun. 17, 2021

(65) Prior Publication Data

US 2022/0402316 A1     Dec. 22, 2022

(51) Int. Cl.
  *B60D 1/01*      (2006.01)
  *B33Y 80/00*     (2015.01)
  *B60D 1/14*      (2006.01)

(52) U.S. Cl.
  CPC ............... *B60D 1/01* (2013.01); *B33Y 80/00* (2014.12); *B60D 1/143* (2013.01)

(58) Field of Classification Search
  CPC .......... B60D 1/01; B60D 1/143; B60D 1/565; B60D 1/04; B60D 1/24; B33Y 80/00; B22F 5/10; C22C 1/0458
  See application file for complete search history.

(56) References Cited

U.S. PATENT DOCUMENTS

| 10,145,271 B2 | 12/2018 | Brown et al. |
| 10,343,725 B2 | 7/2019 | Martin et al. |
| 2011/0285107 A1 * | 11/2011 | Ladzinski .............. B60D 1/565 |
| | | 280/495 |

FOREIGN PATENT DOCUMENTS

| CN | 201922867 | 8/2011 |
| CN | 111001699 | 4/2020 |
| DE | 4115812 A * | 11/1991 ............. B60D 1/187 |

OTHER PUBLICATIONS

Usera et al., Redesign and Manufacturing of a Metal Towing Hook via Laser Additive Manufacturing with Powder Bed, Procedia Manufacturing, Jun. 28, 2017, pp. 824-832, vol. 13, Elsevier B.V.

* cited by examiner

*Primary Examiner* — Rick K Chang
(74) *Attorney, Agent, or Firm* — Burris Law, PLLC

(57) ABSTRACT

A tow hook includes a monolithic additively manufactured side wall defining a vehicle attachment member, a hollow main body extending from the vehicle attachment member, and a hollow towing member extending from the hollow main body. The vehicle attachment member is configured to rigidly attached to a vehicle and the hollow towing member is configured to securely attach to a towing machine such that the vehicle is towable via the tow hook. The vehicle attachment member can be a threaded shaft with a bore extending along a length of the threaded shaft. The side includes a chamfered plurality of apertures extending from an inner surface of the side wall to an outer surface of the side wall, and having with an inner dimension along a length direction of the hollow main body greater than an inner dimension along a circumferential direction of the hollow main body.

17 Claims, 5 Drawing Sheets

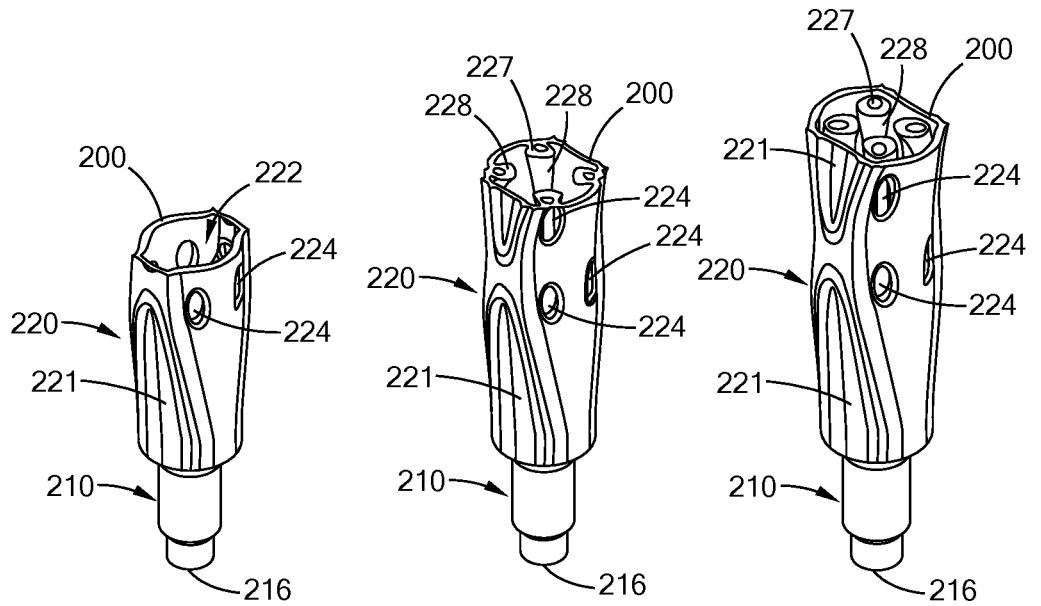
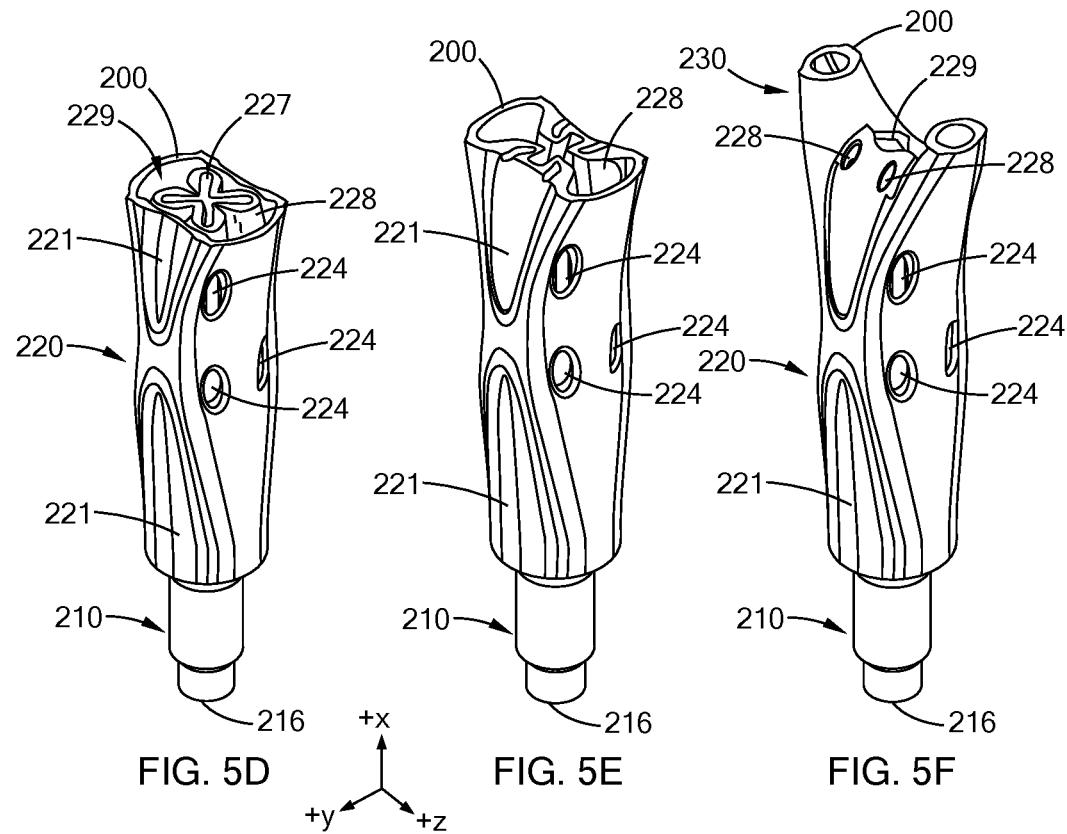
FIG. 5A  FIG. 5B  FIG. 5C  FIG. 5D  FIG. 5E  FIG. 5F

ADDITIVELY MANUFACTURED TOW HOOK

FIELD

The present disclosure relates to towing devices, and particularly to tow hook towing devices.

BACKGROUND

The statements in this section merely provide background information related to the present disclosure and may not constitute prior art.

A tow hook attaches to a vehicle frame and is used for towing a vehicle without the use of tow chains or straps attached to a wheel axle, suspension or bumper of the vehicle. Accordingly, a tow hook provides for safe and convenient towing of the vehicle when desired. For example, racing vehicles, including "street legal" racing vehicles, can include or have a tow hook to assist in towing the vehicle to a starting line of a race track and/or towing the vehicle from the race track to a garage after a race and/or for repair.

The present disclosure addresses the issues related to the design and manufacture of light weight tow hooks in addition to other issues related to the design and manufacture of tow hooks.

SUMMARY

This section provides a general summary of the disclosure and is not a comprehensive disclosure of its full scope or all of its features.

In one form of the present disclosure, a tow hook includes a monolithic additively manufactured side wall defining a vehicle attachment member, a hollow main body extending from the vehicle attachment member, and a hollow towing member extending from the hollow main body. The vehicle attachment member is configured to be rigidly attached to a vehicle and the hollow towing member is configured to securely attach to a towing machine such that the vehicle is towable via the tow hook.

In some variations, the vehicle attachment member is a threaded shaft with a bore extending along a length of the threaded shaft. In at least one variation the bore extends through the threaded shaft such that an interior of the hollow main body is in fluid communication with an outer environment of the tow hook via the bore. In some variations, the threaded shaft has machined threads, and in at least one variation the threaded shaft has near-net shaped threads.

In some variations, the side wall defining the hollow main body includes a plurality of apertures extending from an inner surface of the side wall to an outer surface of the side wall. In such variations, the plurality of apertures can be a plurality of chamfered apertures, and in at least one variation the plurality of apertures has an inner dimension along a length direction of the hollow main body greater than an inner dimension along a circumferential direction of the hollow main body.

In some variations, the side wall defining the hollow main body includes a plurality of hollow internal supports.

In at least one variation, a transverse cross section of the hollow main body defines a total cross sectional area comprising a solid cross sectional area and a hollow cross sectional area, and the hollow cross sectional area is between about 25% and 50% of the total cross sectional area.

In some variations, the hollow towing member is a hollow loop member. In such variations, a transverse cross section of the hollow loop member defines a cross sectional area comprising a solid cross sectional area and a hollow cross sectional area, and the hollow cross sectional area is between about 40% and 50%.

In some variations, the vehicle attachment member, the hollow main body, and the hollow towing member are configured to be self-supporting during additively manufacturing of the vehicle attachment member, the hollow main body, and the hollow towing member.

In at least one variation, the vehicle attachment member, the hollow main body, and the hollow towing member are formed from titanium. And in some variations, the tow hook comprises a longitudinal load to weight ratio greater than or equal to 50,000 N/kg.

In another form of the present disclosure, a tow hook includes a monolithic additively manufactured side wall defining a threaded shaft with a bore extending along a length of the threaded shaft, a hollow main body extending from the threaded shaft, and a hollow towing member extending from the hollow main body. The threaded shaft is configured to rigidly attached to a vehicle and the hollow towing member is configured to securely attach to a towing machine such that the vehicle is towable via the tow hook.

In some variations, the side wall defining the hollow main body includes a plurality of internal supports and a plurality of apertures extending from an inner surface of the side wall to an outer surface of the side wall. And in at least one variation, the tow hook has a longitudinal load to weight ratio greater than or equal to 50,000 N/kg.

In still another form of the present disclosure, a tow hook includes a monolithic additively manufactured titanium alloy side wall defining a threaded shaft with a bore extending along a length of and through the threaded shaft, a hollow main body extending from the threaded shaft, and a hollow towing member extending from the hollow main body. The threaded shaft is configured to rigidly attach to a vehicle and the hollow towing member is configured to securely attach to a towing machine such that the vehicle is towable via the tow hook. Also, the side wall defining the hollow main body includes a plurality of internal supports and a plurality of apertures extending from an inner surface of the side wall to an outer surface of the side wall.

In some variations, the tow hook has a longitudinal load to weight ratio greater than or equal to 50,000 N/kg.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5A is a perspective view of the tow hook in FIG. 3A at a first stage of being additively manufactured according to the teachings of the present disclosure;

FIG. 5B is perspective view of the tow hook in FIG. 3A at a second stage of being additively manufactured according to the teachings of the present disclosure;

FIG. 5C is a perspective view of the tow hook in FIG. 3A at a third stage of being additively manufactured according to the teachings of the present disclosure;

FIG. 5D is a perspective view of the tow hook in FIG. 3A at a fourth stage of being additively manufactured according to the teachings of the present disclosure;

FIG. 5E is perspective view of the tow hook in FIG. 3A at a fifth stage of being additively manufactured according to the teachings of the present disclosure;

FIG. 5F is a perspective view of the tow hook in FIG. 3A at a sixth stage of being additively manufactured according to the teachings of the present disclosure;

Figure 1:
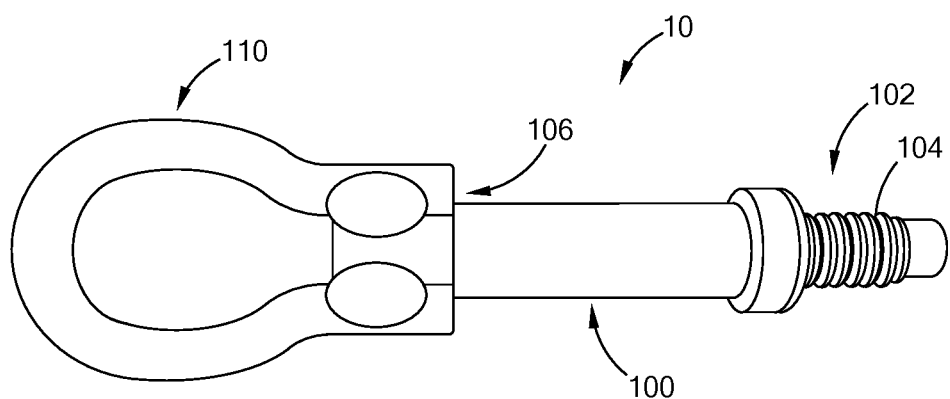
FIG. 1 is a front view of a prior art tow hook.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a traditional tow hook 10 is shown. The tow hook 10 includes a main shaft 100 and a tow loop member 110. The main shaft has a first end portion 102 with threads 104 and a second end portion 106 welded to the tow loop member 110. The main shaft 100 and the tow loop member 110 are typically solid members (i.e., non-porous) made from a wrought material such as steel.

In operation, the first end portion 102 with threads 104 is attached to a frame member (not shown) of a vehicle and a tow chain or tow strap connected to a towing vehicle (e.g., a: "tow truck") is coupled to the tow loop member 110 such that the towing vehicle can pull (tow) the vehicle to a desired location. And while the tow hook 10 is functional in providing or allowing for towing of a vehicle, such a tow hook may be aesthetically undesirable and "heavy" when used with or attached to a supercar such as a Ford GT vehicle.

Figure 2:
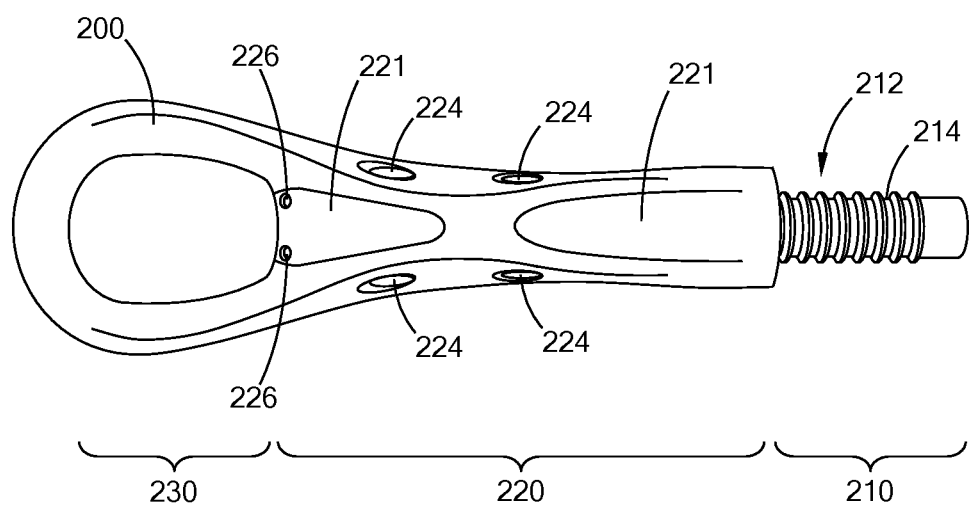
FIG. 2 is a front view of a tow hook according to the teachings of the present disclosure.

Referring to FIG. 2, a tow hook 20 according to the teachings of the present disclosure is shown. As discussed in greater detail below, the tow hook 20 is additively manufactured and has a side wall 200 that defines a vehicle attachment member 210, a hollow main body 220 extending from the vehicle attachment member 210, and a hollow towing member 230 extending from the hollow main body. In some variations, the tow hook 20 is a monolithic tow hook, i.e., the tow hook 20 (and the side wall 200) is additively manufactured as a single integral component. The vehicle attachment member 210 is configured to rigidly attached to a vehicle and the hollow towing member 230 is configured to be securely attached to a towing machine (e.g., a tow truck) such that a vehicle with the tow hook 20 is towable without the use of tow chains or straps attached to a wheel axle, suspension or bumper of the vehicle. In some variations the vehicle attachment member 210 is a threaded shaft 212 with threads 214 and the hollow main body 220 includes chamfered regions 221, a plurality of first apertures 224 (also referred to herein simply as "first apertures 224"), and/or a plurality of second apertures 226 (also referred to herein simply as "second apertures 226"), as discussed in greater detail below. In at least one variation the hollow towing member 230 is a hollow loop member 230.

Figure 3A:
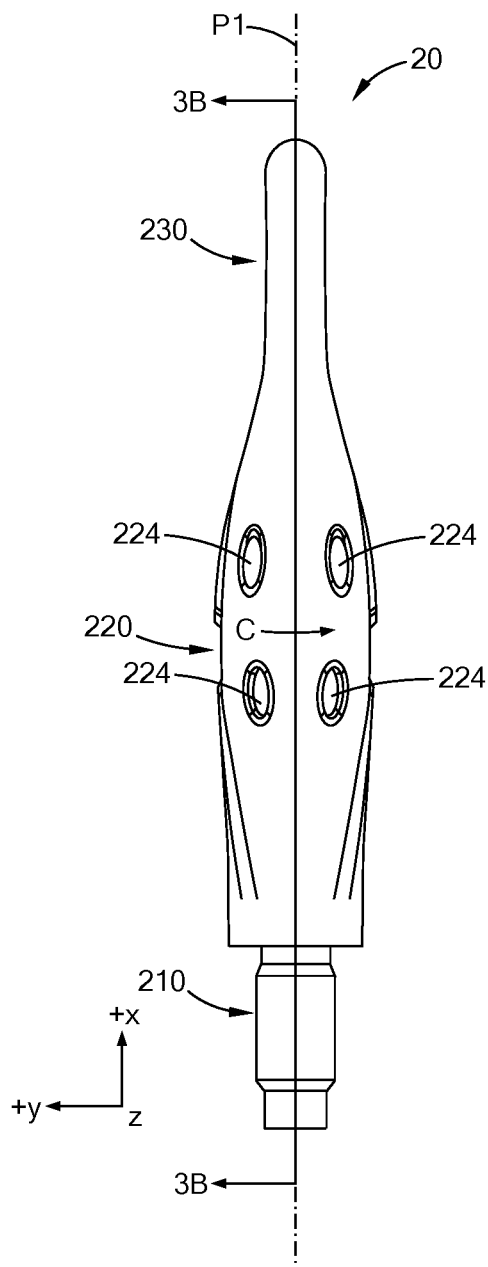
FIG. 3A is a side view of a tow hook according to the teachings of the present disclosure.
Figure 3B:
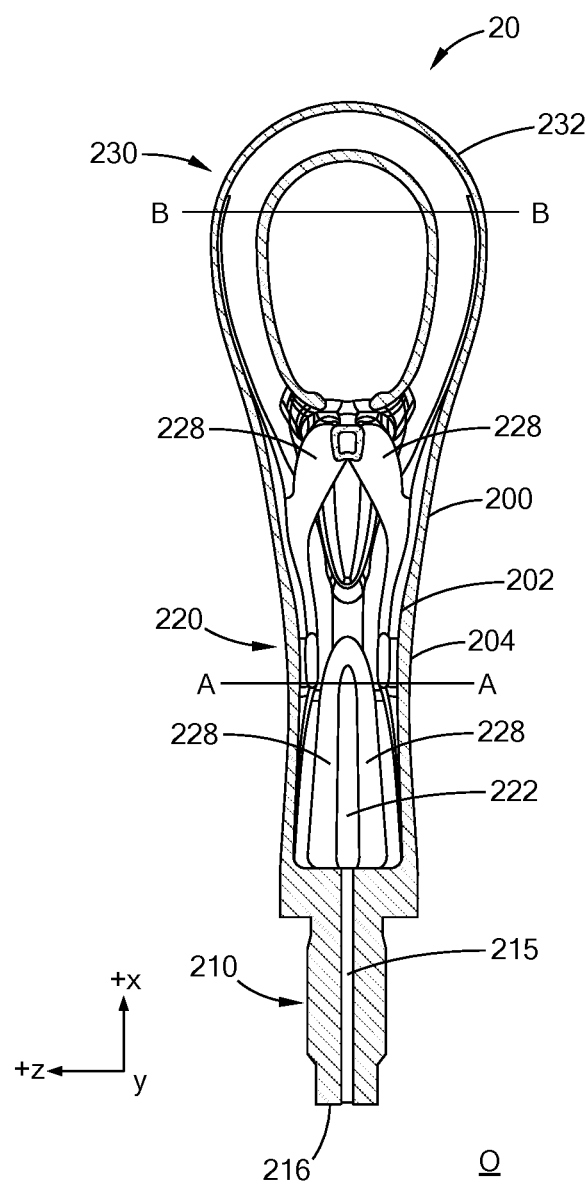
FIG. 3B is a cross sectional view of the tow hook in FIG. 3A.
Figures 4A, 4B:
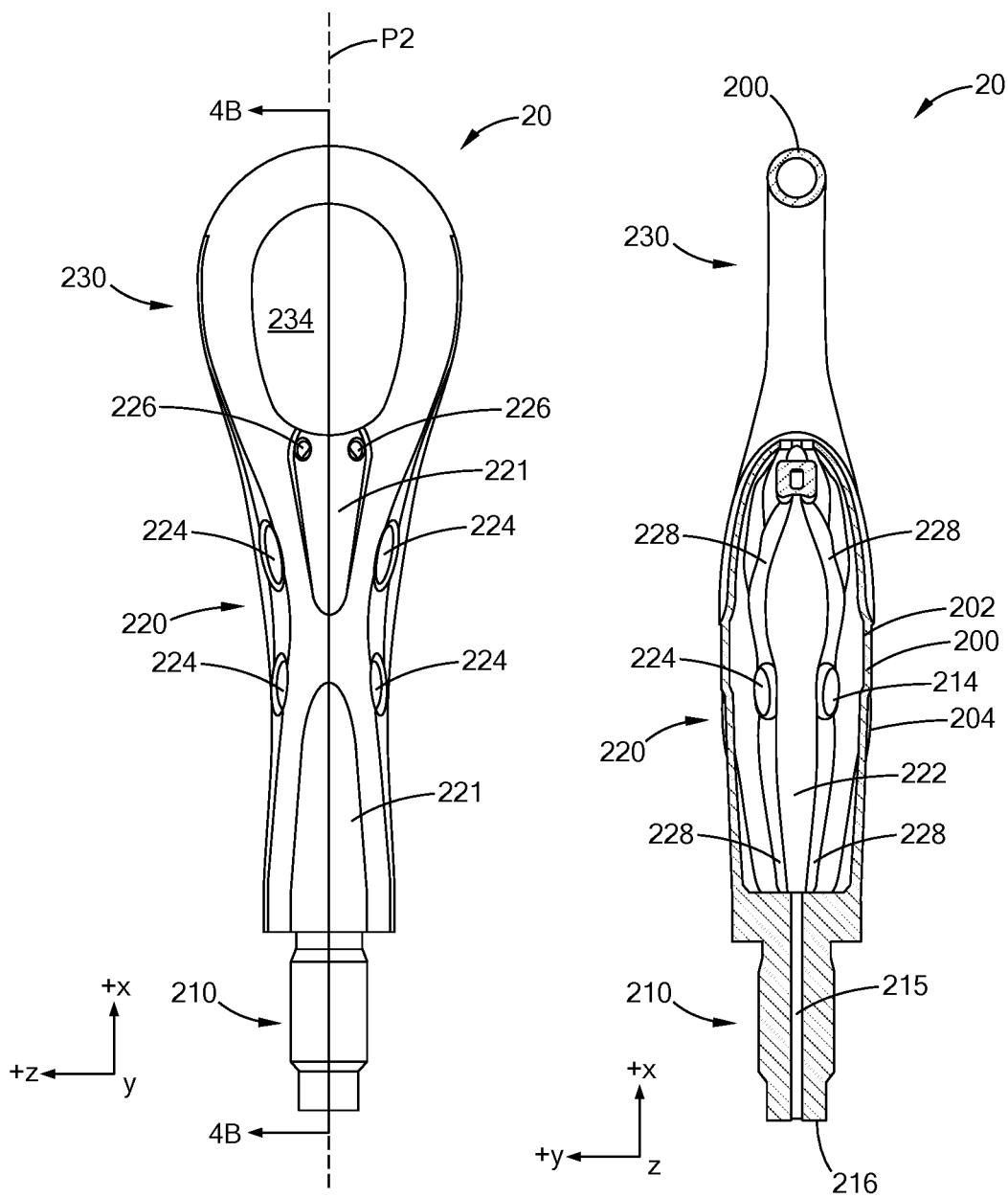
FIG. 4A is a front view of the tow hook in FIG. 3A.
FIG. 4B is a cross sectional view of the tow hook in FIG. 4A.

Referring to FIGS. 3A-3B and 4A-4B, a side view and a front view of the tow hook 20 are shown in FIGS. 3A and 4A, respectively, and cross sectional views of the tow hook 20 shown in FIGS. 3A and 4A are shown in FIGS. 3B and 4B, respectively. In some variations the vehicle attachment member 210 has a bore 215 extending along a length (x direction) of the vehicle attachment member 210 (i.e., the vehicle attachment member 210 is hollow). And in at least one variation, the bore 215 extends from an interior 222 of the hollow main body 220 to a distal end 216 of the vehicle attachment member 210 such that the interior 222 is in fluid communication with an outer environment 'O' of the tow hook 20 via the bore 215. In some variations, the bore 215 provides for removal of excess powder within the vehicle attachment member 210 and/or the interior 222 of the hollow main body 220 during and/or after additively manufacturing of the tow hook 20 as described in greater detail below.

In some variations, the threads 214 (FIG. 2) are formed by machining of the vehicle attachment member 210. That is, the vehicle attachment member 210 is additively manufactured as a shaft with a continuous or uniform cylindrical surface and the shaft is machined to form the threads 214 (also referred to herein as "machined threads"). In other variations, the vehicle attachment member 210 is additive manufactured with near-net shaped threads that are subsequently machined to provide the threads 214. And in still other variations, the vehicle attachment member 210 is additive manufactured with the threads 214 as final shaped threads, i.e., the threads 214 are additively manufactured in their final form without subsequent machining being performed on the vehicle attachment member 210.

The side wall 200 defining the hollow main body 220 includes the first apertures 224 extending from an inner surface 202 to an outer surface 204 of the side wall 200. In some variations, the plurality of first apertures 224, when included, are chamfered apertures, i.e., the side wall 200 defining or bounding the first apertures 224 has a variable thickness such that the first apertures 224 do not have sharp corners of edges. It should be understood that such chamfering of the first apertures 224 reduces weight, enhances aerodynamics of the tow hook 20 and/or provides an aesthetically desirable surface or appearance to the tow hook 20. In at least one variation, the first apertures 224 are elongated along the length direction (x direction) of the tow hook 20. Stated differently the first apertures 224 have an inner dimension along the length of the hollow main body 220 that is greater than an inner dimension along a circumferential direction 'C' (FIG. 3A) of the hollow main body 220. And in at least one variation, the first apertures 224 are located symmetrically about a central longitudinal plane 'P1' of the tow hook 20 as shown in FIG. 3A. It should also be understood that the first apertures 224 provide for removal of excess powder within the interior 222 of the hollow main body 220 during and/or after additively manufacturing of the tow hook 20 as described in greater detail below. The side wall 200 defining the hollow main body 220 also includes one or more internal supports 228. The internal supports extend along the length (x direction) of the two hook 20 and in some variations the one or more internal supports 228 are hollow as described in greater detail below.

In some variations, the side wall 200 defining the hollow main body 220 has a transverse thickness (i.e., a thickness measured along the y-z plane shown in the figures) between about 1.0 millimeter (mm) and about 4.0 mm. For example, in at least one variation the thickness of the side wall 200 is between about 1.5 mm and about 3.0 mm. And in some variations the thickness of the side wall varies along the length (x direction) of the hollow main body 220 as shown in FIG. 3B.

In some variations, the hollow main body 220 has a transverse outer dimension between about 15.0 mm and about 45.0 mm. For example, in some variations the transverse outer dimension of the hollow main body 220 is between about 25.0 mm and about 40.0 mm. And in at least one variation the transverse outer dimension of the hollow main body 220 varies along the length (x direction) of the hollow main body 220 as shown in FIG. 3B.

In addition, one or more transverse cross sections (x-z plane in the figures) of the hollow main body 220 (e.g., see section line A-A in FIG. 3B and FIGS. 5A-5F) has a total cross sectional area comprising a solid cross sectional area and a hollow or vacant cross sectional area. And in some variations the hollow cross sectional area of one or more transverse cross sections of the hollow main body 220 is between about 20% and 60% of the total cross sectional area. For example, in at least one variation the hollow cross sectional area of one or more transverse cross sections of the hollow main body 220 is between about 25% and 50% of the total cross sectional area of the hollow main body 220.

In some variations, the hollow towing member 230 defines a loop member 232 and the side wall 200 defining the loop member 232 has a transverse thickness between about 1.0 mm and about 4.0 mm. In addition, one or more transverse cross sections of the hollow towing member 230 (e.g., see section line B-B in FIG. 3B and FIG. 5F) has a total cross sectional area comprising a solid cross sectional area and a hollow or vacant cross sectional area. And in some variations the hollow cross sectional area of one or more transverse cross sections of the hollow towing member 230 is between about 40% and 70% of the total cross sectional area. For example, in at least one variation the hollow cross sectional area of one or more transverse cross sections of the hollow towing member 230 is between about 40% and 50% of the total cross sectional area of the hollow towing member 230.

Referring particularly to FIGS. 4A-4B, in some variations the first apertures 224, when included, are located symmetrically about another central longitudinal plane 'P2' of the tow hook 20. And in at least one variation the hollow main body 220 includes the second apertures 226 extending from the inner surface 202 to the outer surface 204 of the side wall 200. In some variations, the second apertures 226 are chamfered apertures and it should be understood that the second apertures 226 provide for removal of excess powder within the interior 222 of the hollow main body 220 during and/or after additively manufacturing of the tow hook 20 as described in greater detail below.

Referring now to FIGS. 5A-5F, the tow hook 20 at different stages of manufacture is shown. Particularly, the tow hook 20 is additively manufactured in the x direction starting from the distal end 216 of the vehicle attachment member 210. That is, the vehicle attachment member 210 is manufactured first, then the hollow main body 220 is manufactured on the vehicle attachment member 210, and then the hollow towing member 230 is manufactured on the hollow main body 220. As shown in FIGS. 5A-5D, the internal supports 228 are hollow with an inner passageway 227 that is devoid of material. It should be understood that such hollow internal supports 228 provide desired strength with reduced weight. In addition, and as shown in FIG. 5D, the hollow internal supports 228 merge together and form a clover leaf shape 229 with a common inner passageway 227, thereby further reducing the weight of the tow hook 20.

During and/or after the tow hook 20 is additively manufactured, excess powder that is not part of the tow hook 20 is removed and the bore 215, first apertures 224, and/or second apertures 226 provide access to the interior 222 of the hollow main body 220 such that excess powder can be and is removed. In addition, during additively manufacturing of the tow hook 20, the vehicle attachment member 210, the hollow main body 220, and the hollow towing member 230 are self-supporting such that additional supports are not needed or employed. Accordingly, the design and manufacture of the tow hook 20 reduces powder and energy waste and reduces manufacturing time by not needing to machine off such additional supports. In addition, the tow hook 20 has an overall outer shape that has or occupies a total volume comprising a solid volume (i.e., a volume of the additive manufactured material) and a hollow volume. In some variations, the hollow volume of the tow hook is between about 30% and about 60% of the total volume, and in at least one variation the hollow volume is between about 40% and about 50% of the total volume.

In some variations, and after the tow hook is manufactured, the threads 214 are machined or finished on the vehicle attachment member 210 and/or the outer surface (not labeled) of the tow hook 20 is treated. For example, in at least one variation the hollow main body 220 and the hollow towing member 230 are anodized such that the outer surface has a desired color and/or texture (e.g., smooth or matte).

Figure 6A:
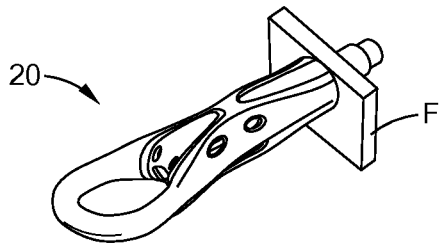
FIG. 6A is a perspective view of the tow hook in FIG. 3A in a first vehicle attachment orientation.
Figure 6B:
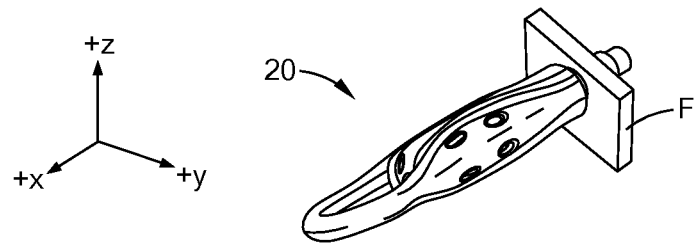
FIG. 6B is a perspective view of the tow hook in FIG. 3A in a second vehicle attachment orientation.
Figure 6C:
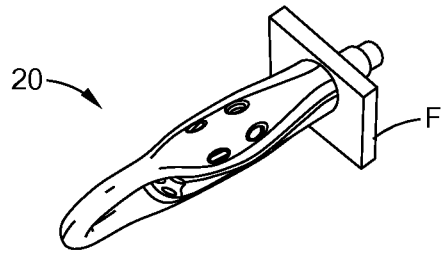
FIG. 6C is a perspective view of the tow hook in FIG. 3A in a third vehicle attachment orientation.
Figure 6D:
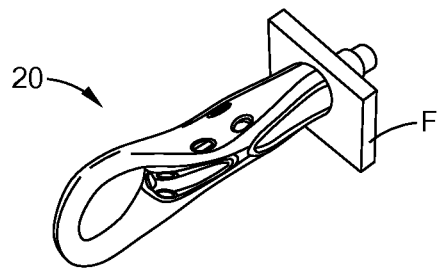
FIG. 6D is a perspective view of the tow hook in FIG. 3A in a fourth vehicle attachment orientation.

It should be understood that the installation of the tow hooks 20 onto a vehicle can result in respective tow hooks 20 having different orientations with respect to a tow chain or strap to be coupled to the hollow towing member 230. For example, and with reference to FIGS. 6A-6D, four representative orientations of the tow hook 20 mounted to a frame member 'F' of a vehicle are shown. Particularly, FIG. 6A shows the hollow towing member 230 oriented at a 0-degree angle relative to the x-y plane shown in the figures, FIG. 6B shows the hollow towing member 230 oriented at a 30-degree angle, FIG. 6C shows the hollow towing member 230 oriented at a 60-degree angle, and FIG. 6D shows the hollow towing member 230 oriented at a 90-degree angle relative to the x-y plane shown in the figures. Other orientations between (e.g., 45 degrees) and beyond (e.g., 120 degrees) those shown can be used. However, and even with the tow hooks 20 having the different orientations shown in FIGS. 6A-6D, and other orientations not shown, the design and manufacture of the tow hooks 20 takes such variations into account such that the tow hooks 20 according to the teachings of the present disclosure provides desired towing capacity independent of the installed orientation.

It should be understood from the present disclosure that a lightweight aesthetically designed tow hook is provided. The tow hook is additively manufactured using known, or yet to be developed, metal additively manufactured techniques such as but not limited to selective laser melting (SLM), direct metal laser sintering (DMSL), direct metal laser melting (DMLM), and electron beam melting (EBM). In some variations the tow hook is manufactured from titanium alloy powder. In other variations, the tow hook is manufactured from other alloy powders such as steel powered, stainless steel powder, aluminum alloy powder, among others. In at least one variation the two hook is manufactured from Ti-6Al-4V titanium alloy powder and has a weight between 140 g to 200 g. In addition, the tow hook has a strength sufficient to pull a 10,000 Newton (N) load. Accordingly, the tow hook has longitudinal load to weight ratio greater than or equal to 50,000 N/kg. In some variations the tow hook has longitudinal load to weight ratio greater than or equal to 50,000 N/kg and less than or equal to 150,000 N/kg, in at least one variation the tow hook has longitudinal load to weight ratio greater than or equal to 50,000 N/kg and less than or equal to 100,000 N/kg, and in some variations the tow hook has longitudinal load to weight ratio greater than or equal to 50,000 N/kg and less than or equal to 75,000 N/kg.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A tow hook comprising:
a monolithic additively manufactured side wall defining a vehicle attachment member, a hollow main body extending from the vehicle attachment member, and a hollow towing member extending from the hollow main body,
wherein the vehicle attachment member is configured to rigidly attached to a vehicle, the hollow towing member is configured to securely attach to a towing machine such that the vehicle is towable via the tow hook, and the side wall defining the hollow main body comprises internal supports extending along a length of the hollow main body and a plurality of chamfered apertures extending from an inner surface of the side wall to an outer surface of the side wall.

2. The tow hook according to claim 1, wherein the vehicle attachment member is a threaded shaft with a bore extending along a length of the threaded shaft.

3. The tow hook according to claim 2, wherein the bore extends through the threaded shaft such that an interior of the hollow main body is in fluid communication with an outer environment of the tow hook via the bore.

4. The tow hook according to claim 2, wherein the threaded shaft comprises machined threads.

5. The tow hook according to claim 2, wherein the threaded shaft comprises near-net shaped threads.

6. The tow hook according to claim 1, wherein the side wall defining the hollow main body comprises a plurality of hollow internal supports.

7. The tow hook according to claim 1, wherein a transverse cross section of the hollow main body defines a total cross sectional area comprising a solid cross sectional area and a hollow cross sectional area, and the hollow cross sectional area is between about 25% and 50%.

8. The tow hook according to claim 1, wherein the hollow towing member is a hollow loop member.

9. The tow hook according to claim 8, wherein a transverse cross section of the hollow loop member defines a cross sectional area comprising a solid cross sectional area and a hollow cross sectional area, and the hollow cross sectional area is between about 40% and 50%.

10. The tow hook according to claim 1, wherein the vehicle attachment member, the hollow main body, and the hollow towing member are configured to be self-supporting during additive manufacturing of the vehicle attachment member, the hollow main body, and the hollow towing member.

11. The tow hook according to claim 1, wherein the vehicle attachment member, the hollow main body, and the hollow towing member are formed from titanium.

12. The tow hook according to claim 1, wherein the tow hook comprises a longitudinal load to weight ratio greater than or equal to 50,000 N/kg.

13. A tow hook comprising:
a monolithic additively manufactured side wall defining a threaded shaft with an internal bore extending along a length of the threaded shaft,
a hollow main body extending from the threaded shaft, and
a hollow towing member extending from the hollow main body,
wherein the threaded shaft is configured to rigidly attached to a vehicle, the hollow towing member is configured to securely attach to a towing machine such that the vehicle is towable via the tow hook, and the side wall defining the hollow main body comprises a plurality of apertures extending from an inner surface of the side wall to an outer surface of the side wall, the plurality of apertures having an inner dimension along a length direction of the hollow main body greater than an inner dimension along a circumferential direction of the hollow main body.

14. The tow hook according to claim 13, wherein the side wall defining the hollow main body comprises a plurality of internal supports and a plurality of apertures extending from an inner surface of the side wall to an outer surface of the side wall.

15. The tow hook according to claim 13, wherein the tow hook comprises a longitudinal load to weight ratio greater than or equal to 50,000 N/kg.

16. A tow hook comprising:
a monolithic additively manufactured titanium alloy side wall defining a threaded shaft with a bore extending along a length of and through the threaded shaft, a hollow main body extending from the threaded shaft, and a hollow towing member extending from the hollow main body,
wherein the threaded shaft is configured to rigidly attach to a vehicle, the hollow towing member is configured to securely attach to a towing machine such that the vehicle is towable via the tow hook, and the side wall defining the hollow main body comprises a plurality of internal supports and a plurality of chamfered apertures, the plurality of chamfered apertures extending from an inner surface of the side wall to an outer surface of the side wall and having an inner dimension along a length direction of the hollow main body greater than an inner dimension along a circumferential direction of the hollow main body, the internal supports being integral with the side wall and extending along an interior length of the hollow main body.

17. The tow hook according to claim 16, wherein the tow hook comprises a longitudinal load to weight ratio greater than or equal to 50,000 N/kg.

* * * * *